Oct. 23, 1934.   C. C. SUNDERLAND   1,977,744
CABLE WRAPPING MACHINE
Filed Jan. 20, 1933   11 Sheets-Sheet 1

Oct. 23, 1934.  C. C. SUNDERLAND  1,977,744
CABLE WRAPPING MACHINE
Filed Jan. 20, 1933   11 Sheets-Sheet 5

INVENTOR
Charles C. Sunderland
BY
Philipp Sawyer Rice Kennedy
ATTORNEYS

Oct. 23, 1934.  C. C. SUNDERLAND  1,977,744
CABLE WRAPPING MACHINE
Filed Jan. 20, 1933  11 Sheets-Sheet 7

INVENTOR
Charles C. Sunderland
BY
ATTORNEYS

Oct. 23, 1934.  C. C. SUNDERLAND  1,977,744
CABLE WRAPPING MACHINE
Filed Jan. 20, 1933        11 Sheets-Sheet 10

Oct. 23, 1934.  C. C. SUNDERLAND  1,977,744
CABLE WRAPPING MACHINE
Filed Jan. 20, 1933  11 Sheets-Sheet 11

INVENTOR
Charles C. Sunderland
BY
Philipp Sawyer Rice Kennedy
ATTORNEYS

Patented Oct. 23, 1934

1,977,744

UNITED STATES PATENT OFFICE 1,977,744

CABLE WRAPPING MACHINE

Charles C. Sunderland, Trenton, N. J., assignor to John A. Roebling's Sons Company, Trenton, N. J., a corporation of New Jersey Application January 20, 1933, Serial No. 652,659

34 Claims. (Cl. 117—37)

This invention relates to machines of that class used for wrapping wire about the cables of suspension bridges after the cables are in place and compacted with suspension bands as usual in such constructions.

The general object of the invention is to provide an improved machine of this class which shall be of higher efficiency and capacity than those previously in use, and especially to provide a construction in which the wrapping close to the cable suspension bands shall be secured by a single machine and avoid the expense and delay of providing special rigging in connection with the transfer of the machine from one inter-band space to the next.

A further object is to provide an improved wrapper construction by which the cable wrapping may be applied and wire readily rewound on the same spool when required, and by which the filling of the spools with wire shall be convenient.

For a full understanding of the invention, a detailed description of a cable wrapping machine embodying all the features of the invention in their preferred form will now be given in connection with the accompanying drawings forming a part of this specification and the features forming the invention then specifically pointed out in the claims.

Referring to said drawings, A is the cable being wrapped, on which the carriage B runs on wheels C at each end of the carriage and carrying the motor D for driving the wrapper E, the wrapper being supported on the cable A on the saddle to be described. The wrapper E is moved along the cable by feed of the wire as wrapped, as usual in such constructions, the driving shaft from the motor being telescoped to permit such movement independently of the motor and carriage and at intervals the carriage with the motor D is moved along the cable to follow the wrapper by any suitable pull-along, mounted as desired on the cable, only a small light pull-along being required for this movement of the carriage on the supporting wheels C. The machine is shown as wrapping with the wrapper moved by the pull feeder, the wire being wrapped on the cable from the end of the wrapper in advance as the wrapper moves along the cable.

The pull-along is shown as connected to the right hand end of the carriage by the connection 20, a similar connection 20 being shown at the opposite end of the machine, so that the machine may be run and the cable wrapped in either direction as desired. The pull-along may be a small electric motor operated drum moved by hand along the cable to the position desired and then its winding up strap operated to move the carriage through connection 20 when the carriage is to be moved, or the pull-along may be located at the end of the cable and its drum controlled automatically to move the carriage step by step as required. The control of the carriage movement need not be automatic, but the operator may move the carriage by hand at intervals or control the pull-along by hand. An automatic control is illustrated, by which brackets 21 on the carriage carry pulleys 22, over which run ropes 23 having counter-weights 24, these ropes 23 running over pulleys 25 on wrapper E and their returns attached to the brackets 21, so that the weights 24 aid the feeding movement of the wrapper E and are raised by the intermittent movement of the carriage independently of the wrapper. This counter-weight rope arrangement is at both sides of the wrapper and on one of the ropes 23 is a trip 26 which operates one or the other of switches 27 and through electrical connections controls the pull-along for the movement of the carriage as the weight rises and falls. Provision for the operation of the machine in either direction is made by duplicating the brackets 21 and other parts at the opposite ends of the carriage, the pulley attachment to the wrapper and rope run being reversed if the machine is to be run in the opposite direction from that shown.

The cable A is shown as having the usual suspension bands F at intervals along the cable, one of these being shown. The carriage wheels C will run over these bands, but it is necessary to raise the carriage frame, the motor and the wrapper for passing these bands, and for the purpose of raising the carriage and motor, hydraulic jacks G are mounted on each pair of wheels at the opposite ends of the carriage and controlled by the pump handle 29 and the release valve rod 30, to raise the carriage frame and motor D for passing the bands and for shifting the wrapper under the motor, as fully explained hereafter.

Figure 1:
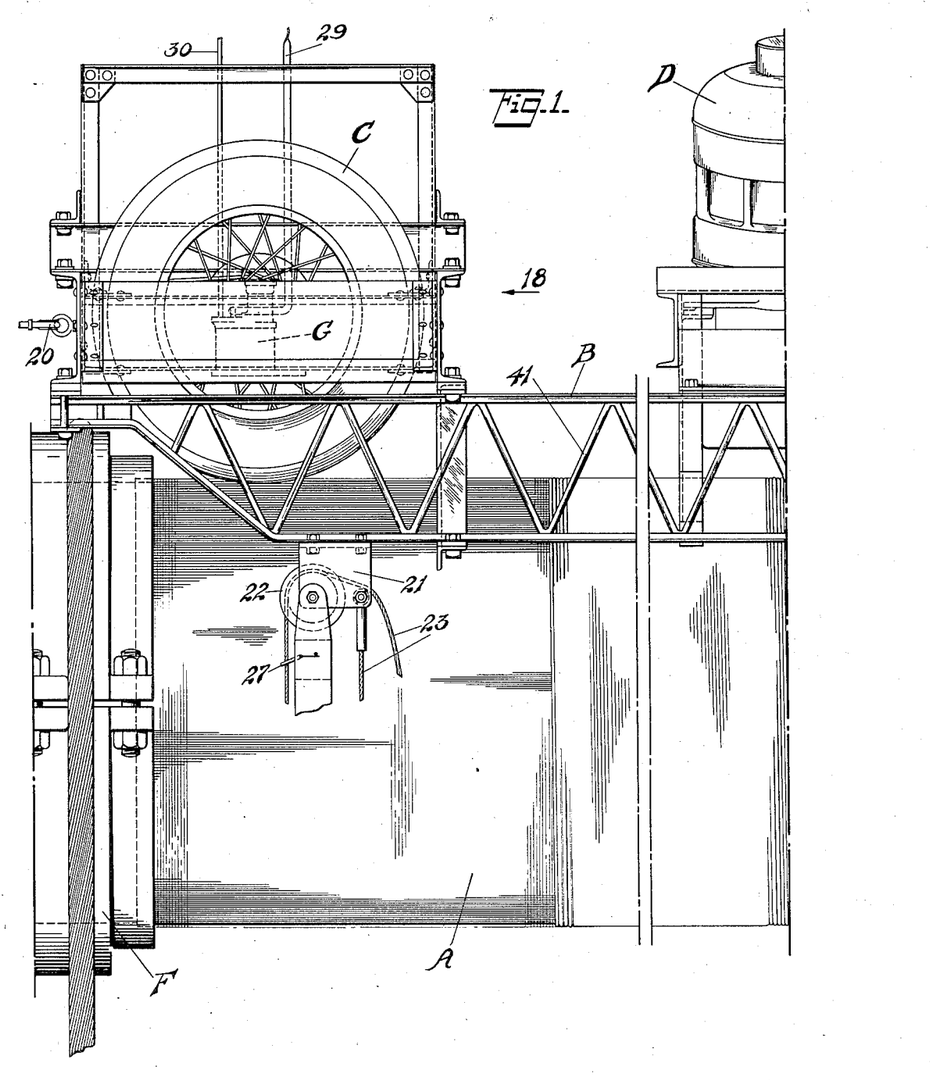
Figures 1, 1A and 1B are a side elevation of the machine in the operation of wrapping a cable, with the wrapper and its driving mechanism partly in section for purpose of illustration.
Figure 1A:
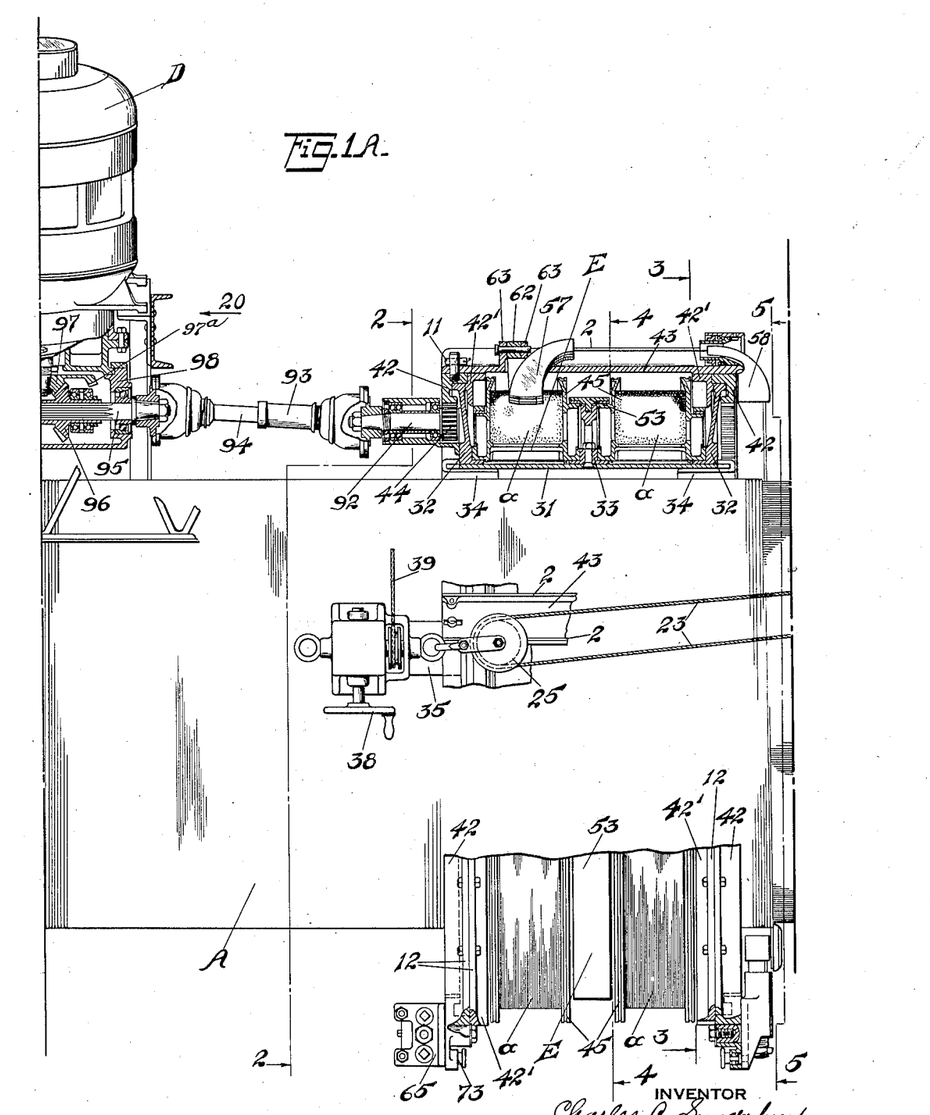
Figure 1B:
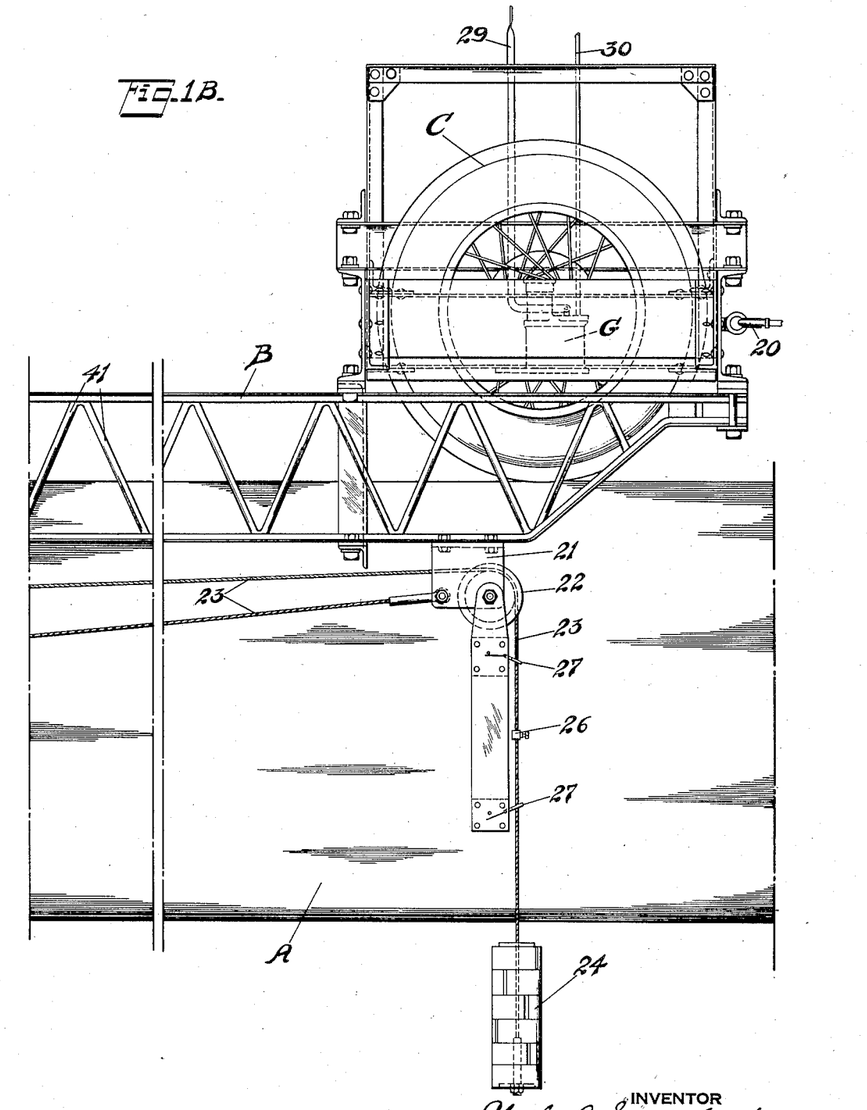
Figure 2:
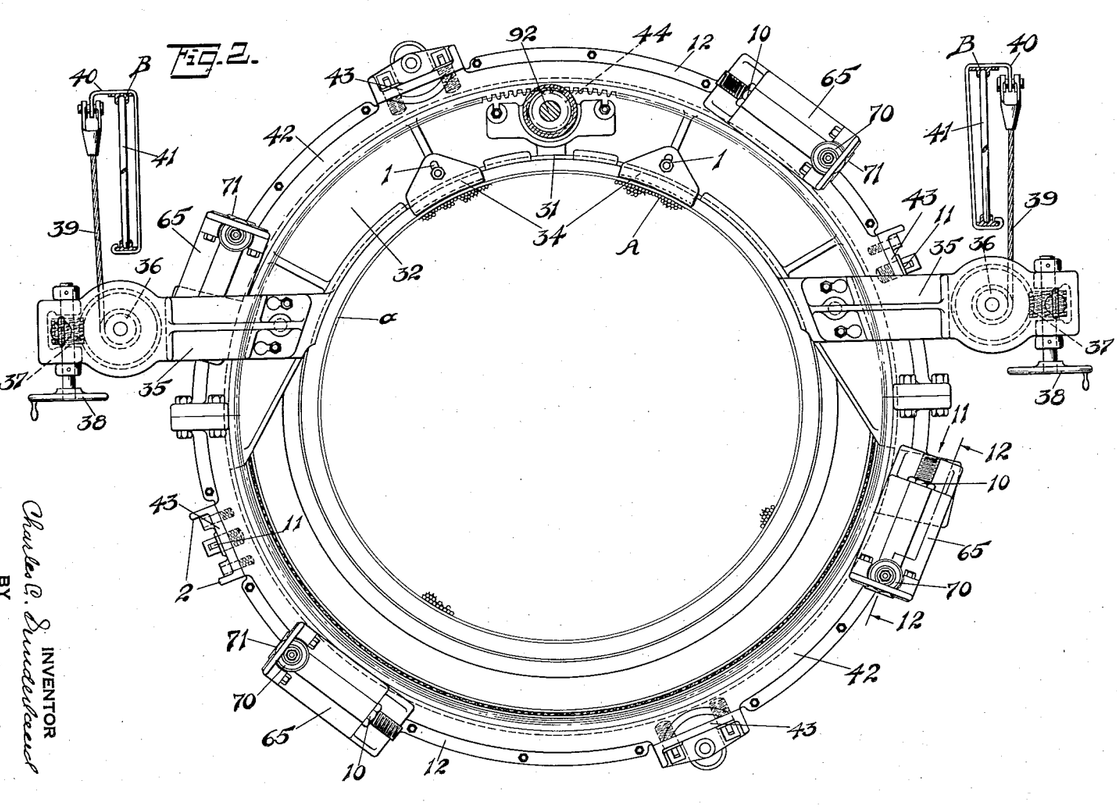
Figures 2, 3, 4 and 5 are cross sections on respectively lines 2, 3, 4 and 5 of Figure 1A, looking in the direction of the arrows on Figure 1.
Figure 3:
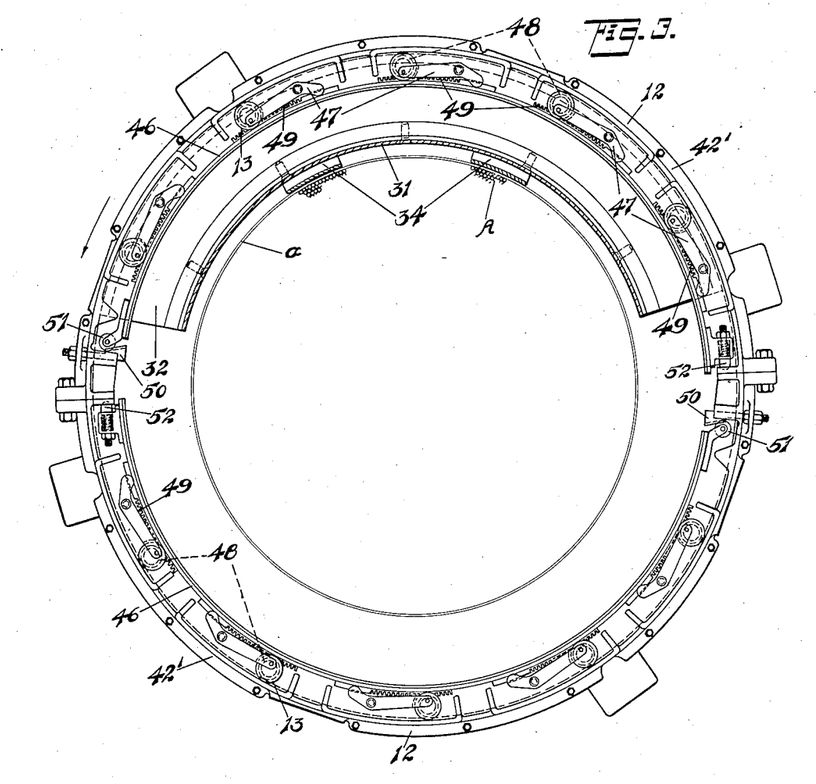
Figure 4:
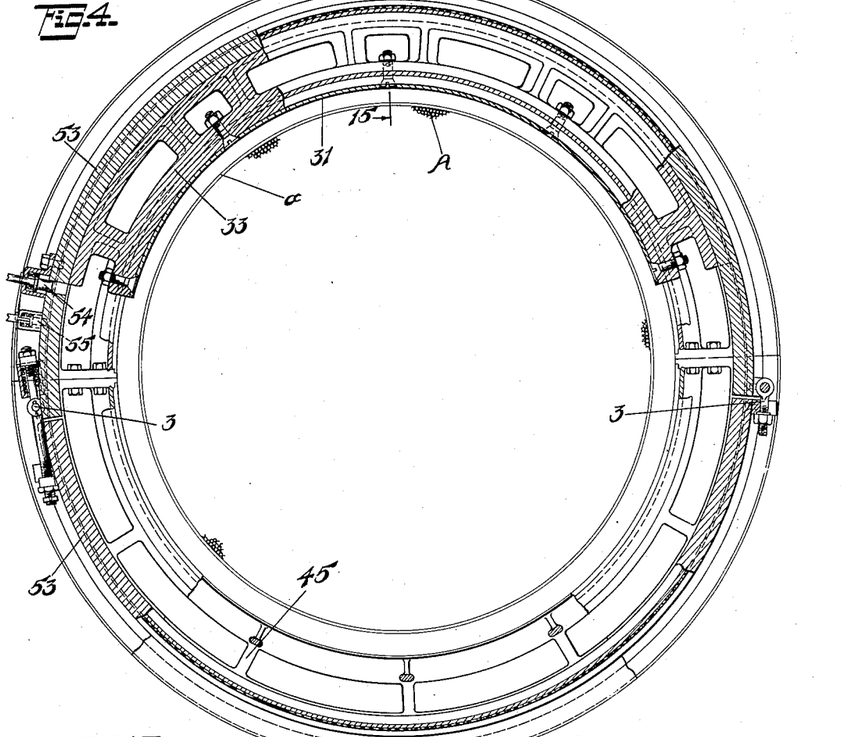
Figure 5:
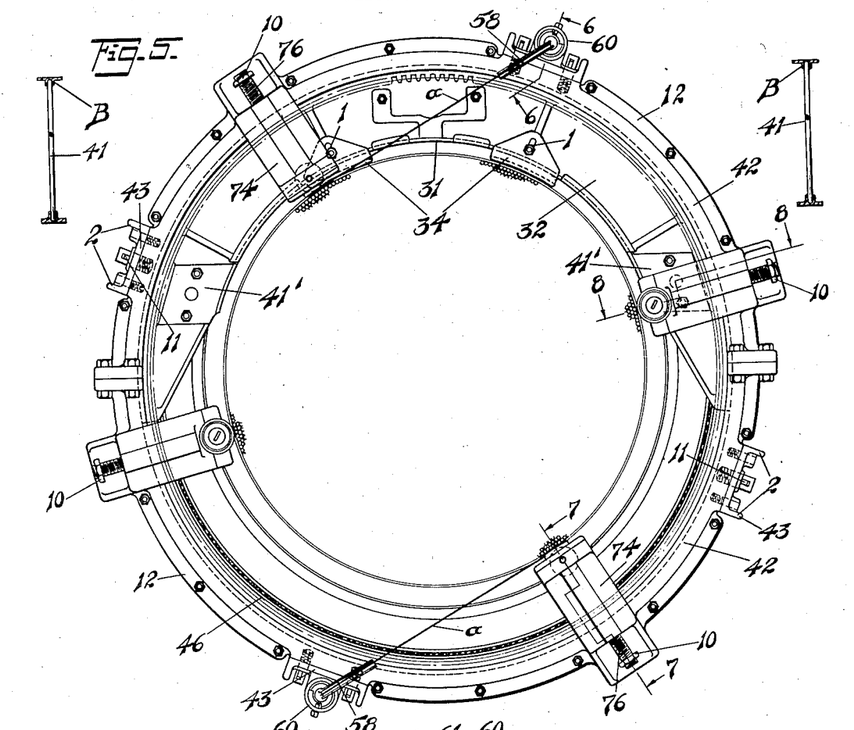
Figure 6:
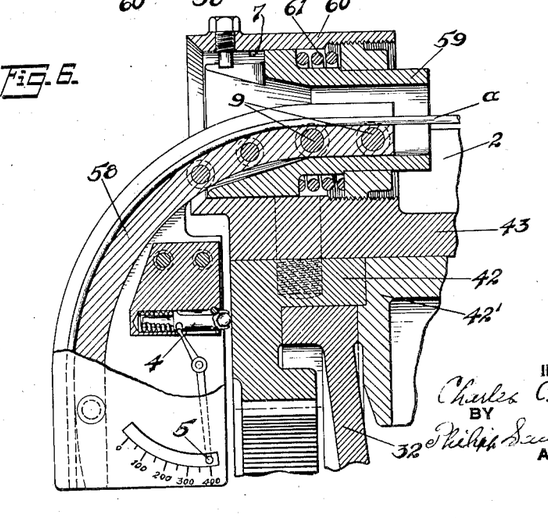
Figure 6 is an enlarged detail section on the line 6 of Figure 5, showing the wire guide and tension indicator.

Referring now to the wrapper, the general construction of which is shown especially in Figures 1A, 2 to 6, 13, 14, the wrapper includes the saddle extending over about the upper half or less of the cable and formed with curved bottom plate 31 connecting the two end ring segments 32 and middle ring segment 33 thus forming a non-rotating support for the rotating wrapper parts, and this saddle rides upon the cable by shoes 34 resting upon the cable so as to provide engaging and supporting surfaces, and adjustable radially on the saddle by slot and bolt connections 1 and adjustable by shimming the bolts, so as to permit the accurate adjustment of the saddle on the cable. This saddle is equipped at opposite sides and at each end with removable arms 35 projecting outside the rotating parts of the wrapper and carrying drums 36 driven by worm gears 37 and hand wheels 38 to wind up or unwind ropes 39, the upper ends of which are attached to hangers 40 passing over and supported by bars 41 on the frame B, so that by winding up the ropes 39 on the drums 36, the saddle with parts carried thereby may be raised to a position where the saddle and upper half of the wrapper will pass the bands F. The arms 35 and connected parts at the end of the wrapper towards which the wrapper is moving, which is the right hand end as shown in Figure 1A, and as illustrated in Figure 5, are removed after the band has been passed, being used on the advance end of the wrapper only for the purpose of lifting the saddle evenly, Figure 5 showing the bars 41 to which the arms 35 at this end of the wrapper are connected when in use, by the same connections as shown in Figure 2.

Upon the saddle rings 32 is mounted to rotate the wrapper proper, consisting of end rings 42 connected by bars 43 which preferably are strengthened by ribs 2, being shown as channel irons, these rings 42 carrying internal gears meshing with driving gear 44 on the driving shaft by which the wrapper is driven from the motor. The bars 43 are shown as removably secured to the rings 42, so as to permit their removal for reversal of the wrapper and for direct lead of the wires to the reels in spooling, as described hereafter. The bars 43 may be bolted or otherwise removably secured to the rings 42, but for ease of removal and replacement are shown as slipped over three studs in the ring and held by driftkey 11 on the central stud. On the inner sides of the rings 42 are rings 42', separate from but fixed to rings 42, preferably by bolted flanges 12, as shown, and between these and the middle ring 33 are mounted the wire reels 45 carrying the wrapping wire a, the machine being shown as wrapping two wires simultaneously, these reels running on the saddle, there being provided between flanges on the reels 45 and the rings 42' friction drive tension bands 46, these bands acting as brake bands in wrapping and as driving bands in spool filling, having friction tension faces, the pressure of which bands upon the reel flanges is adjustable, as shown particularly in Figures 3, 13 and 14. For this purpose each ring 42' carries pivoted thereon levers 47 bearing upon the bands 46 at one end and carrying at the other end eccentric pinions 48 which engage rack sections 49 on band 46 so that by moving the band 46 and racks in either direction, the eccentric pinions 48 are rotated to increase or decrease the pressure of the levers 47 and the pinion shrouds 13 on the friction band 46. The tension bands 46 upon which the rack sectors are mounted are divided into two sections, each extending through approximately one half of the circle, and each section of the band is moved by an adjustable wedge piece 50 engaging a roller 51 carried by the pressure band section. The other end of each section abuts against a shoulder on the ring 42' by a spring pin 52 providing for this circumferential adjustment of the sections of the tension bands.

Figure 16:
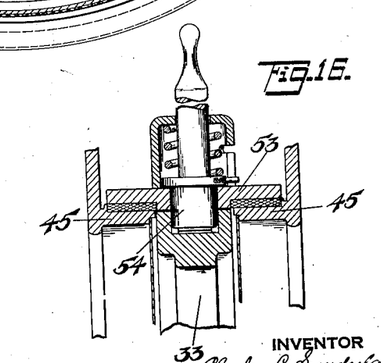
Figure 16 is a detail section of the lock for the floating ring in unwrapping.
Figure 17:
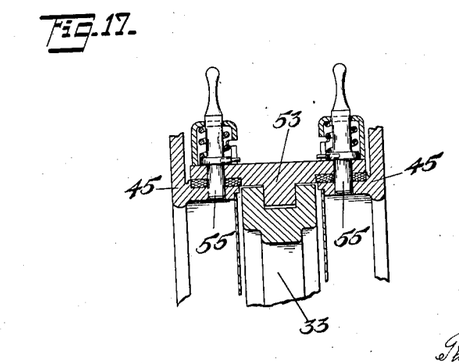
Figure 17 is a similar detail view showing locks used for connecting the spools through the floating ring in spooling.

Between the reels 45 and held in position by a rib running in a groove on the middle segment 33 of the saddle, is a floating ring 53, carrying friction faces bearing on the reel flanges and this ring may be fixed to the stationary saddle ring 33 by spring-pressed handled pin 54 entering a hole in ring 33, as shown in Figure 16, or may tie the two reels 45 together by spring-pressed handled pins 55 entering holes in the reel flanges, as shown in Figure 17. The pins 55 are used to lock the reels together through the floating ring 53 only in spooling, that is, winding the supply of wire on the reels, the reels thus being tied together so as to move in unison and with the required pull as the reels are driven by the rings 42'. In wrapping the cable all the pins 54 and 55 are withdrawn so as to leave the floating ring 53 free except for the friction between the ring and the reels, and in unwrapping and rewinding the wire onto the spools the pins 55 are withdrawn and the floating ring 53 is locked to the stationary saddle disc 33 by pin 54. The floating ring 53 is made in two sections connected by couplings 3 on opposite sides of the wrapper, one of these being an adjustable spring coupling.

The wire a from the reels 45 passes through the curved leads 57 from the spools and over curved yielding guides 58 outside the ring 42 to the cable. These yielding guides 58 are fixed, as by rivets 9, to sleeves 59 mounted to slide in the sleeves 60 on the tie bars 43 and against the pressure of adjustable coiled springs 61. These yielding guides 58 carry spring-pressed indicator plungers 4 bearing against the side of rings 42, which plungers actuate indicators 5, each having a pointer running on a scale on side plates attached to guide 58 to indicate the wire tension by the pressure on and position of the yielding guides 58.

The leads 57 and guides 58 with their mountings are detachably mounted on the tie bars 43. The leads 57 are carried by arms 62 secured between ears 63 on bars 43 so as to receive the wire properly from the reels and guide it to the wrapping end of the wrapper, and the yielding guides 58 and their mountings are detachably mounted in guides 7 formed on sleeves 60 on bars 43. Arms 62 may be swung between the ears 63 so as to properly position the leads 57 on reversal of the bars 43, as described hereafter.

Figures 11, 12, 13, 14:
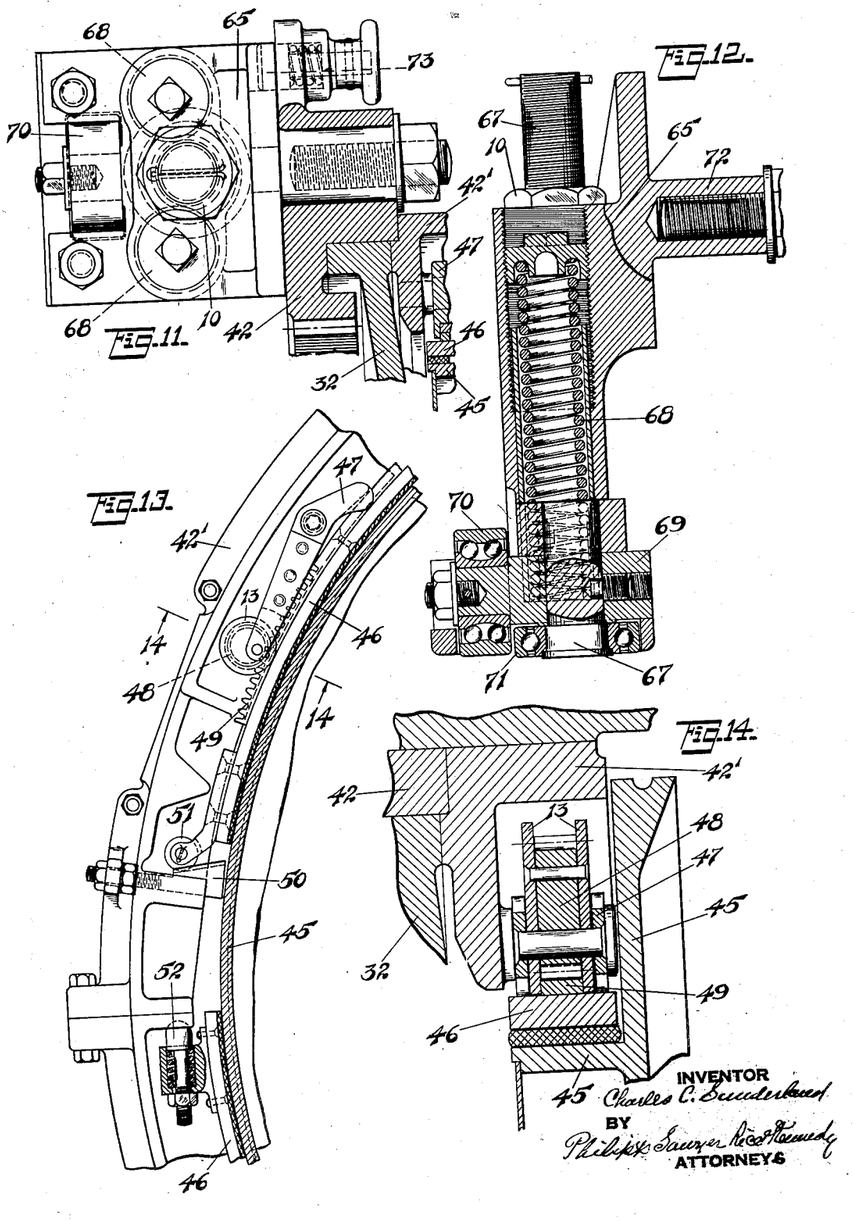
Figure 11 is a detail sectional plan of Figure 12, showing the push feeder.
Figure 12 is a section of Figure 11, corresponding to Figures 7 and 8.
Figure 13 is a detail enlarged side view of a portion of the wrapper adjustable brake mechanism shown in Figure 3.
Figure 14 is a section on the line 14 of Figure 13.
Figure 15:
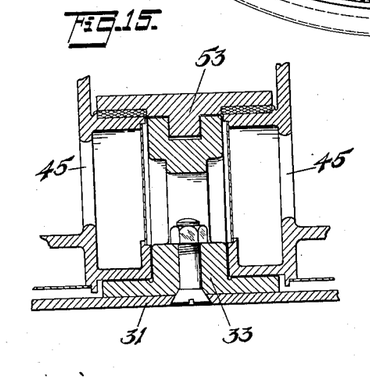
Figure 15 is a detail cross section of a portion of the reels and floating ring between them.

For feeding the wrapper along the cable as the cable is wrapped and pressing the wrapping wires upon the cable in wrapping, the following construction is preferably used. At the rear end of the wrapper relatively to the movement of the wrapper, as shown in the drawings, the combined presser and pusher shown in detail in Figures 11 and 12 is used when the wrapper is pushed. In this construction, a bracket 65 on the side of the ring 42 is adjustably mounted on screw 67, which bracket provides chambers for two adjustable coiled springs 68, which bear upon a block 69, at the outer side of which is a stud carrying the presser roll 70, preferably on ball-bearings as shown, this presser roll lying upon the last few coils of wire wrapped, so as to press these coils onto the cable under the pressure of springs 68. At the side of the presser roll 70 toward which the wrapper is moving, is the pusher 71 against which the last coil of wire is laid, thus moving the wrapper along the cable. The pusher 71, as shown, preferably consists of a driving ring mounted to rotate freely on ball-bearings so as to avoid friction drag on the wire under the push necessary for feeding the wrapper. On the screw 67 is a nut 10 which may be screwed down upon the screw against the bracket 65 to lock the presser and pusher up against the pressure of springs 68 when not in use, as shown in Figure 12. This whole presser-foot and pusher construction is mounted on the ring 42 by stud 72 so that it may be rotated out of operative position when not used in wrapping, being held in either position by means of spring catch 73 shown as provided with the usual thumb-piece for operation. The pusher constructions are shown in the drawings as swung out of position for operation, the machine being shown as operated by pulling the wrapper.

Figures 7, 9, 10:
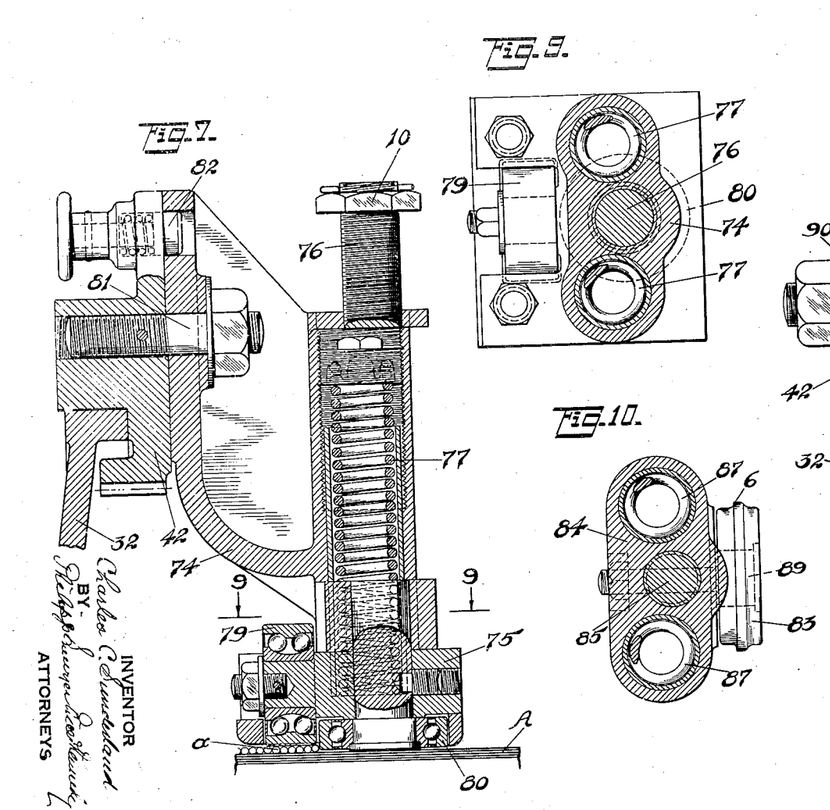
Figures 7 and 8 are detail cross sections on an enlarged scale on, respectively, the lines 7 and 8 of Figure 5, showing the two types of pull feeders used.
Figures 9 and 10 are corresponding sections on, respectively, the lines 9 and 10 of Figures 7 and 8.
Figure 8:
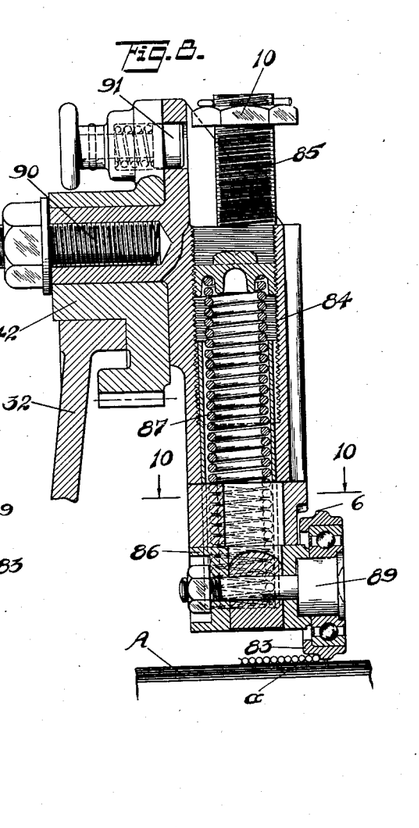

At the opposite end of the wrapper, that is, the end in advance relatively to the movement of the wrapper on the cable, is mounted a similar construction of presser-foot and driving ring, used in pulling the wrapper as shown in the drawings, and this end of the wrapper carries also a similar construction of puller adapted for use in wrapping close to a band, these constructions being shown in Figures 5, 7 to 10. In Figures 7 and 9, the bracket 74 mounted on ring 42 carries the block 75 with adjustment screw 76, pressure springs 77, presser-foot 79 and feeding ring or puller 80, the bracket 74 being pivoted on ring 42 by stud bolt 81 and locked in operative or inoperative position of the presser-foot and puller by spring catch 82, all substantially the same as described above in connection with the pusher at the opposite end of the wrapper. The advance end of the wrapper carries, also, a similar construction except that the wide presser-foot is omitted and the puller roller 83 is mounted at the outer side of the ring 42 to rotate vertically and provided with a narrow rib 6 which acts for moving the wrapper along the cable. In this construction, 84 is the adjustable bracket on ring 42, 85 the adjustment screw carrying block 86 with the pressure springs 87 pressing on block 86 carrying stud 89 on which is mounted the puller 83, bracket 84 being pivoted on ring 42 by stud bolt 90 and locked in operative or inoperative position by the spring catch 91, substantially as in the construction previously described. Both the pullers of Figures 7 and 8 are shown in operative position, as in Figure 1A, the nuts 10 on screws 76, 85 being run up to release the blocks 75, 86 for operation under the pressure of springs 77, 87.

The motor D rotates the wrapper through gear 44 engaging the internal gear on ring 42 at either end of the wrapper, this gear 44 being carried on stub shaft 92 mounted in bearings removably secured on the saddle ring segment 32 so as to shift in from one end of the wrapper to the other as required. The shaft from the motor to this stub shaft 92 is made in two telescoping parts 93, 94, and these parts are connected by swiveled joints, respectively, to the stub shaft 92 and a shaft 95 driven by bevel gears 96, 97 from the vertical motor shaft. This shaft 95 is mounted on bearings in a ring cap 98 which is swiveled to turn around the axis of the motor shaft and held by spring catch 8, so that by releasing the catch, driving shaft 95 may be turned end for end below the motor shaft, thus permitting the reversal of the shafts 92, 93, 94 for shifting the wrapper E to the opposite side of the motor, that is, to the left of the motor from the position shown in Figure 1A, this shifting of the wrapper being secured by raising the frame B and motor D above the cable sufficiently to permit the saddle and upper parts of the wrapper and the driving shafts to pass beneath the motor to the opposite side of the motor. For passing a suspending band, the lower half of the wrapper except the saddle must be removed. As the saddle 31 does not extend over more than a half of the cable circumference, it is not necessary to divide this, but the other complete rings of the wrapper are divided into half cylinders as shown in Figures 2 to 5, so that the lower half of the rings and parts carried thereby may be dropped from the cable for passing a band and replaced to complete the wrapper when wrapping is to be resumed in the next space between bands, as fully described hereafter. The gearing between motor D and shaft 95 preferably is made for securing two different speeds, so that the wrapper may be run slowly next a cable band, and faster during the normal operation of the machine through the main length of the wrapping. For this purpose, two gears 97 and 97a are shown as carried by the single gear body on the motor and the gear 96 is mounted on a sleeve on shaft 95 with another gear on the other end of the sleeve to be engaged with gear 97a by shifting the sleeve.

The operation of the machine will be understood from a brief description.

As shown in the drawings, the wrapper is moving to the right between bands, propelled by the wire windings acting on the pullers 80, 83, the rotating parts of the wrapper being driven by the motor at the higher speed through gears 96, 97a, telescope shafts 93, 94, stub shaft 92 and gear 44 engaging the internal gear on the ring 42 at the rear end of the pusher, the wires being wrapped at the opposite or forward end of the pusher. As the wires are wrapped on the cable, the coils are pressed down by the presser 79 and the horizontal surface of the puller 83, under the pressure of springs 77, 87, as shown in Figures 7, 8. Each wire $a$ is acted on first by the presser and puller 79, 80, as it passes onto the cable, and then by the puller 83, as shown in Figure 5, until the wrapper approaches a band F.

The retarding friction on the spools 45 for winding the wire coils tightly on the cable is secured by the tension bands 46 bearing on the outer reel flanges, their friction pressure being regulated by levers 47 adjusted by racks 49 and eccentric pinions 48. The cable being smaller than the reels, there must be slip between the reels and rings 42 securing the constant tension in wrapping or unwrapping and rewinding. In this wrapping movement the pins 55 are withdrawn from the flanges on the reels 45, so as not to tie these reels together and the floating ring 53 is free except for the friction between the ring and reels. The tension on the wire passing from the reels to the cable is shown by the indicator 5 actuated by the yielding guide 58 through plunger 4.

As the wrapper reaches the limit of its feeding movement free from the motor, permitted by the telescope shaft 93, 94, the pull-along is actuated to draw the carriage B with motor D to close up the telescope shaft for the continued feed of the wrapper independently of the motor. In the construction shown, this step-by-step movement of the carriage B with motor D is produced automatically by the trip 26 on cable 23 actuating lower switch 27 to energize the motor of the pull-along as the weight 24 reaches its lowest position, and, as the weight 24 is raised by the movement of the carriage with the motor towards the wrapper, the trip 26 engages the switch 27 at the end of this carriage movement to deenergize the pull-along motor and stop the carriage, this automatic intermittent movement of the carriage D being repeated throughout the wrapping as the wrapper reaches the limit of its movement independent of the motor.

This wrapping operation with feed by the pullers 80, 83 continues until the wrapper approaches a band, when the bracket 74 carrying the puller 80 and pressers 79 is released by the catch 82 and swung upward on its pivot on ring 42 to throw them out of operation and the operaton of wrapping is then continued up close to the band with the wapper fed by the puller 83. The last few coils of the wires next the band will be wrapped by throwing the puller 83 out of operation and moving the wrapper by hand to lay the wires up to the band where the last coils are forced under the band flange by hand and secured to complete the wrapping between two bands.

Figure 18:
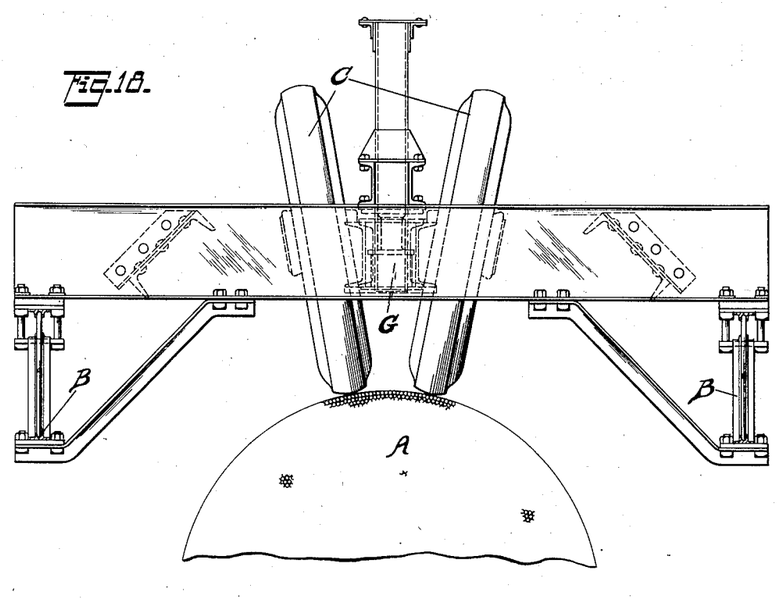
Figures 18 and 19 are enlarged end elevations of one end of the carriage with frame parts removed, looking in the direction of the arrow 18 of Figure 1, Figure 18 showing the carriage in normal position and Figure 19 showing the carriage raised on the wheels for reversal of the wrapper or passing a band.
Figure 19:
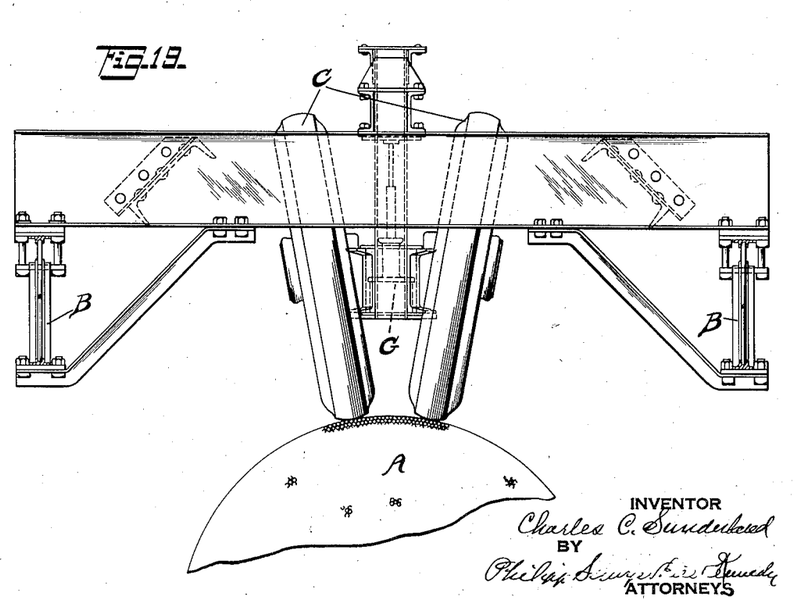
Figures 20, 21:
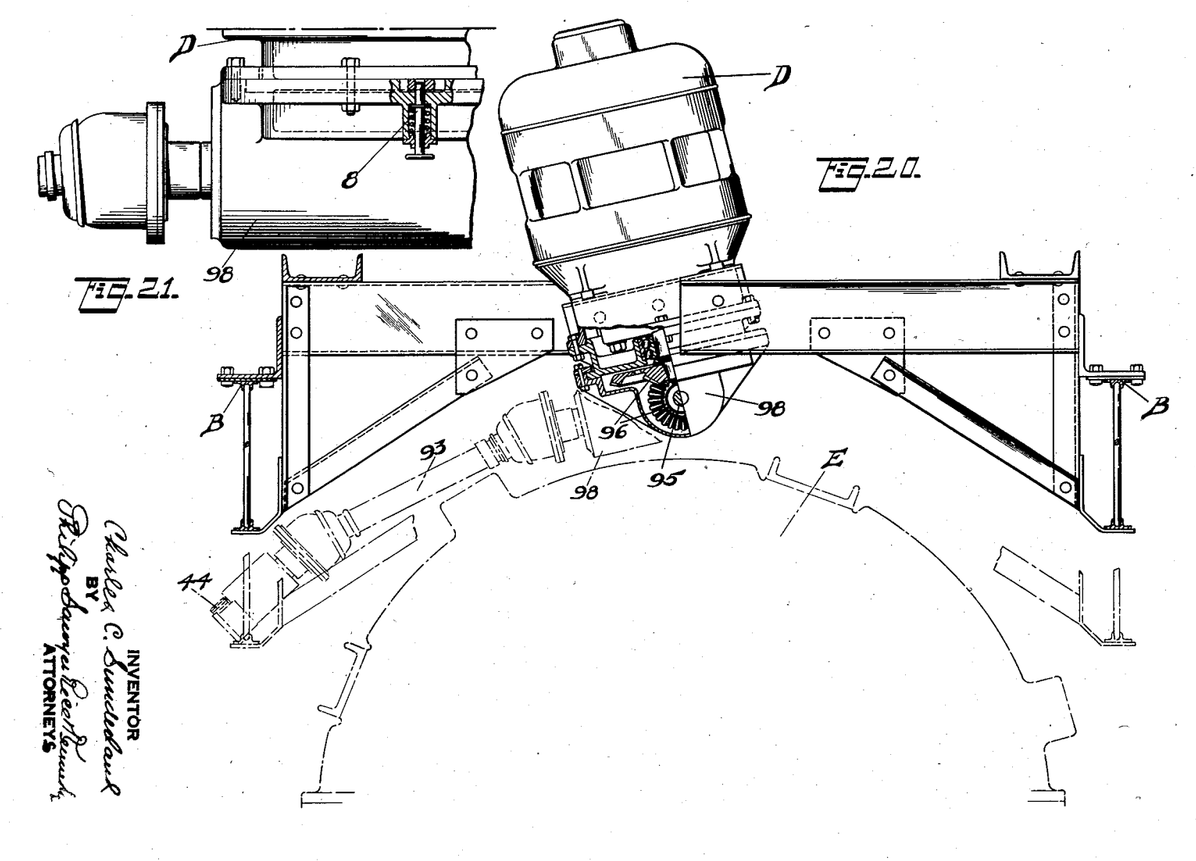
Figure 20 is a diagrammatic cross section looking in the direction of the arrow 20 of Figure 1A, showing the motor and frame raised, with the normal position of the frame, the wrapper, and the position of the wrapper driving shaft in swinging for reversal of the driving shaft being shown in dotted lines.
Figure 21 is an enlarged detail showing driving shaft reversing cap and lock.

The band is now to be passed by the wrapper, which operation is as follows: The jacks G at both ends of the carriage are operated by the hand operation of the pump handle 29 to raise the frame of the carriage B from the position shown in Figure 18 to that shown in Figure 19, thus raising the carriage frame and motor D sufficiently to pass the band and to permit the wrapper and driving shaft to pass over the cable and under the motor to the opposite side of the motor. The lower half of the wrapper is then removed by separating the split rings and the saddle and upper parts of the wrapper are raised sufficiently to clear the band by the four lifter cables 39 at opposite sides and ends of the wrapper operated by handles 38. The wire on the reels 45 must be unwound for this operation, but the operator can readily arrange, on filling the reels, to have little wire thereon when the band is reached. The stub shaft 92 with its bearing and gear 44 having been released from the wrapper, the shafts 92, 93, 94 with shaft 95 are then swung about the motor on the swiveled ring cap 98 so as to move the shafts to the opposite side of the motor, this movement of the shafts between the raised motor and cable being shown in dotted lines in Figure 20.

The wrapper is then pushed under the motor to its opposite side, the bearing for stub shaft 92 and gear 44 connected to the ring 42 at the opposite end of the wrapper from that shown in Figure 1A, the lower half of the wrapper replaced and the saddle and upper parts lowered to complete the wrapper, the leads 57 and guides 58 and their connected parts reversed to wrap at the opposite end of the wrapper by the reversal of the bars 43 end for end, the leads 57 adjusted to proper position by swinging arms 62, both pullers 80, 83 locked in upper position by nuts 10 and swung upward on ring 42 to throw them out of operation, as the pushers 71 are to be used for feeding. The cable 23 must be of sufficient length or a longer automatic feed cable is substituted for the cable 23 and connected to the arms 35 at the rear end of the wrapper, the arms 35 at the forward end of the wrapper being removed.

The spools are then filled with wire, the wrapper moved by hand or by the low speed gearing from motor D to lay on the first few coils of the wire next the band F. The pushers 71 with pressers 70 are swung downward into operative position and released by nuts 10. In laying on these first coils with the usual undercut on the bands, the wrapper is held by hand against longitudinal movement on the cable, so that the action is to force the successive coils into the undercut. This operation is continued until the undercut is filled with the wrappings and the wrapper released, so that the regular wrapping operation of the machine is resumed with the wrapper moved by pushers 71, each wire being acted on by two pressers 70 and pushers 71. This wrapping with feed by pushers 71 is continued to any desired point after the wrapper has been moved to a point where the wrapper and carriage may ride upon the wrapped portion of the cable, after which the wrapper is reversed to the opposite or advance side of the motor and all the parts returned to the position shown in the drawings for wrapping and feeding at the forward end of the wrapper, which operation is continued until the next band is reached.

In case it be necessary to unwrap any of the cable, this may readily be done and the unwrapped wires rewound on the reels 45 by simply reversing the motor so as to operate the rotatable parts of the wrapper in the opposite direction, the wire then being led back over the guides 58 and through the leads 57 and rewound upon the reels, the friction ring 53 acting to secure the desired rewinding tension, pin 54 being engaged as shown in Figure 16. In such unwrapping and rewinding, the wrapper may be moved by hand or, if moving down on an inclined portion of the cable, the feeding may be automatically controlled by the pullers.

In spooling, the bars 43 of the wrapper F are removed and the wire led directly to the reels 45 rotated by the gear 44 and rings 42 as in the wrapping operation, the two reels then being tied together for driving from one end of the wrapper, by inserting the pins 55 into the flanges of the two reels 45, as shown in Figure 17, so as to tie the reels together through the ring 53, pin 54 being free from the saddle 33.

It will be seen that tension on the wires in wrapping is maintained by the brake and tension bands 46 and for unwrapping and rewinding is maintained by brake band 53 and that the slip of the spools on the bands is such as to secure the proper wrapping on the cable and unwrapping therefrom, with the cable of less circumference than the wire layer being unwound from or wound on the reel, and constantly changing with the successive layers. The spring mounted pressers and pushers or pullers provide for accommodating the elliptical or other form and irregularities of the cable and maintaining the proper position of the wrapper. They also permit the same wrapper to be used in wrapping cables differing somewhat in size and provide for the saddle riding on either the unwrapped or wrapped portion of the cable. If cables varying in size more than thus provided for are to be wrapped, it is necessary only to substitute wrappers, with the same carriage and motor.

It will be understood that the invention is not to be limited to the specific arrangement or form of the devices shown, but that many modifications may be made within the invention defined by the claims.

What is claimed is:

1. A cable wrapping machine comprising a carriage movable along the cable and a motor carried thereby, and a cable wrapper movable along the cable independently of the carriage and having wrapping devices rotated by the motor.

2. In a cable wrapping machine, the combination with a carriage movable along the cable and a motor carried thereby, of a cable wrapper mounted on the cable independently of the carriage and having wrapping devices rotated by the motor and devices engaging the wrapping to move the wrapper along the cable by the successive wrappings, and driving connections for rotating the wrapping devices by the motor permitting the movement of the wrapper along the cable independently of the carriage.

3. In a cable wrapping machine, the combination with a carriage movable along the cable and a motor carried thereby, of a cable wrapper mounted on the cable independently of the carriage and having wrapping devices rotated by the motor and devices engaging the wrapping to move the wrapper along the cable by the successive wrappings, driving connections for rotating the wrapping devices by the motor permitting the movement of the wrapper along the cable independently of the carriage, and means for moving the carriage along the cable independently of the wrapper.

4. In a cable wrapping machine, the combination with a carriage movable along the cable and a motor carried thereby, of a cable wrapper mounted on the cable independently of the carriage and having wrapping devices rotated by the motor and devices engaging the wrapping to move the wrapper along the cable by the successive wrappings, driving connections for rotating the wrapping devices by the motor permitting the movement of the wrapper along the cable independently of the carriage, means for moving the carriage along the cable independently of the wrapper, and means for controlling the motion of the carriage by the movement of the wrapper.

5. In a cable wrapping machine, the combination with a carriage movable along the cable and a motor carried thereby, of a cable wrapper mounted on the cable independently of the carriage and having wrapping devices rotated by the motor and devices engaging the wrapping to move the wrapper along the cable by the successive wrappings, driving connections for rotating the wrapping devices by the motor permitting the movement of the wrapper along the cable independently of the carriage, and means controlled by the movement of the wrapper for securing a step by step motion of the carriage along the cable independently of the wrapper.

6. In a cable wrapping machine, the combination with a carriage movable along the cable and a motor carried thereby, a wrapper movable along the cable and having wrapping devices adapted to wrap the cable at either end of the wrapper, driving connections between the motor and wrapping devices for driving the wrapping devices on either side of the motor, and means for raising the motor to permit the wrapper to be moved along the cable from one side of the motor to the other for reversing the wrapping end of the wrapper.

7. In a cable wrapping machine, the combination with a carriage movable along the cable and a motor carried thereby, of a wrapper movable along the cable and having wrapping devices adapted to wrap the cable at either end of the wrapper, detachable driving connections between the motor and wrapper mounted to swing about the motor for driving the wrapper on either side of the motor, and means on the carriage for raising the carriage frame and motor to permit the wrapper to be moved along the cable from one side of the motor to the other and the driving connections to be reversed below the motor for reversing the wrapping end of the wrapper.

8. In a cable wrapping machine, the combination with a carriage movable along the cable and a motor carried thereby, of a wrapper movable along the cable and having wrapping devices adapted to wrap the cable at either end of the wrapper, detachable driving connections between the motor and wrapper mounted to swing about the motor for driving the wrapper on either side of the motor, and power operated means on the carriage for raising the carriage frame and motor to permit the wrapper to be moved along the cable from one side of the motor to the other and the driving connections to be reversed below the motor for reversing the wrapping end of the wrapper.

9. In a cable wrapping machine, the combination with a carriage movable along the cable and a motor carried thereby, of a wrapper having a saddle movable along the cable independently of the carriage, wrapping devices on said saddle rotated by the motor, and means on the carriage for raising the motor and saddle to permit the carriage and saddle to pass a cable band.

10. In a cable wrapping machine, the combination with a carriage movable along the cable and a motor carried thereby, of a wrapper having a saddle movable along the cable, wrapping devices on said saddle adapted to wrap at either end of the wrapper, feeding means at opposite ends of the wrapper operated by the successive wrappings for feeding the wrapper along the cable, reversible driving connections for driving the wrapping devices by the motor on either side of the motor, and means on the carriage for raising the motor and saddle to permit the motor and saddle to pass a cable band and to permit the wrapper and driving connections to be moved to the opposite side of the motor for reversing the wrapping end of the wrapper.

11. In a cable wrapping machine, the combination with a saddle supported on and movable along the cable, of a wrapping frame enclosing the cable and rotating on the saddle, and one or more supply reels mounted on the frame and enclosing the cable, and friction members between the reels and frame controlling the rotation of the reels.

12. In a cable wrapping machine, the combination with a saddle supported on and movable along the cable, of a wrapping frame enclosing the cable and rotating on the saddle, one or more supply reels mounted on the frame and enclosing the cable, friction bands between the reels and frame controlling the rotation of the reels, and means for adjusting the friction between the bands and reels to control the wrapping tension.

13. In a cable wrapping machine, the combination with a saddle supported on and movable along the cable, of a frame enclosing the cable and rotating on the saddle, one or more supply reels mounted on the frame and enclosing the cable, friction bands between the reels and frame controlling the rotation of the reels, pressure devices on the frame for pressing the bands on the reels, and means for adjusting the pressure devices to control the wrapping tension.

14. In a cable wrapping machine, the combination with a saddle supported on and movable along the cable, of a frame enclosing the cable and rotating on the saddle, one or more supply reels mounted on the frame and enclosing the cable, friction members between the reels and frame controlling the rotation of the reels, said frame being rotatable in either direction for wrapping or unwrapping and rewinding on the reels, and guides acting to guide the wrapping to the cable or from the cable to the reels.

15. In a cable wrapping machine, the combination with a saddle supported on and movable along the cable, of a frame comprising end rings enclosing the cable, and removable bars connecting the rings, one or more supply reels on the frame enclosing the cable, friction members between the reels and frame for wrapping, and means for securing the reels to the frame, whereby wire may be wound on the reels by rotating the frame and reels with the bars removed and the reels secured to the frame.

16. In a cable wrapping machine, a wrapper having a rotating frame enclosing the cable, one or more supply reels in the frame enclosing the cable and driving gears at either end of the frame, wire guides reversible for wrapping at either end of the wrapper, and pushers and pullers at, respectively, the rear and front end of the wrapper for feeding the wrapper by the successive wrappings.

17. In a cable wrapping machine, a wrapper having a rotating frame enclosing the cable, one or more supply reels on the frame enclosing the cable and driving gears at either end of the frame, wire guides reversible for wrapping at either end of the wrapper, and pushers and pullers at, respectively, the rear and front end of the wrapper for feeding the wrapper by the successive wrappings, said pushers and pullers being movable into and out of position for operation.

18. In a cable wrapping machine, a wrapper having a rotating frame enclosing the cable, driving gears at either end of the frame, wire guides reversible for wrapping at either end of the wrapper, pushers and pullers at, respectively, the rear and front end of the wrapper for feeding the wrapper by the successive wrappings, a narrow puller at the front end of the wrapper for wrapping close to a cable band, said pushers and pullers being movable into and out of position for operation.

19. In a cable wrapping machine, a wrapper having a feeding device actuated by the successive wrappings to move the wrapper along the cable and mounted to rotate on an axis normal to the cable.

20. In a cable wrapping machine, a wrapper having at its front end a puller for rotating on an axis normal to the cable and a narrow puller rotating transversely to the cable for wrapping close to a band, said pusher and puller being actuated by successive wrappings to move the wrapper along the cable.

21. In a cable wrapping machine, a wrapper having a horizontally rotating pusher at the rear end of the wrapper and a narrow vertically rotating puller at the front end of the wrapper, said pusher and puller being actuated by the successive wrappings to move the wrapper along the cable and movable into and out of operative position.

22. In a cable wrapping machine, a wrapper adapted for wrapping at either end of the wrapper, and having a pusher at the rear end of the wrapper and a puller at the front end of the wrapper, actuated by the successive wrappings to move the wrapper along the cable, said pusher and puller being movable into and out of operative position.

23. In a cable wrapping machine, a wrapper having a carrying member pivoted to swing on the wrapper, and spring-pressed pressing and feeding devices carried by said member and adapted to be moved into and out of operative position by the swinging movement of said carrying member.

24. In a cable wrapping machine, a wrapper having a screw-threaded plunger carrying a presser acting on the wrapping, a spring acting to press the plunger and presser toward the cable, and a nut on the plunger for locking the plunger with the presser in inoperative position, said plunger and presser being mounted to be swung away from the cable when out of operation.

25. In a cable wrapping machine, a spring-pressed plunger carrying a presser roller acting on the wrapping and a feeding roller coacting with successive wrappings to move the wrapper along the cable, in combination with means for adjusting the plunger to move the pressing and feeding rollers into and out of operative position.

26. In a cable wrapping machine, a wrapper having a rotating frame enclosing the cable, a wrapping supply reel enclosing the cable and rotating on the frame, a friction band between the frame and reel, pressure levers acting on the band, eccentric pinions for adjusting said levers, and a movable rack for adjusting said pinions.

27. In a cable wrapping machine, a yielding guide for the wrapping material moved in accordance with the tension of the wrapping and a tension indicator engaged by the guide to control the indicator by the position of said guide as moved by the wrapping material.

28. In a cable wrapping machine, a wrapper having a lead and guide for the wrapping mounted for reversal on the wrapper for wrapping at either end of the wrapper without changing the position of the wrapper.

29. In a cable wrapping machine, a wrapper having a rotating frame enclosing the cable and comprising end rings and bars connecting the rings and reversible endwise, a reel enclosing the cable and mounted on the frame, and guiding devices for the wrapping mounted on said bars and reversible therewith for wrapping at either end of the wrapper.

30. In a cable wrapping machine, a wrapper having a rotating frame enclosing the cable and comprising end rings and removable bars connecting the rings, and a supply reel on said frame between the end rings rotated by the frame in a direction to wind the wrapping material on the reel, whereby the reel may be filled by rotating the frame and reel with the bars removed.

31. In a cable wrapping machine, a wrapper having a rotating frame enclosing the cable, a supply reel thereon enclosing the cable, friction means between the reel and frame acting to brake the reel in wrapping and rotate the reel in the opposite direction for unwrapping, and wrapping guides adapted to guide the wrapping from the reel to the cable or reversely, whereby the reversal of the rotation of the frame permits the unwrapping and rewinding of the wrapper on the reel.

32. In a cable wrapping machine, a wrapper having a rotatable frame enclosing the cable, a supply reel on said frame and enclosing the cable, and lead 57 and guide 58 for guiding the wrapping from the reel to the cable and reversible for wrapping at either end of the wrapper.

33. In a cable wrapping machine, the combination with a carriage and a motor carried by the carriage, of a wrapper mounted on the cable independently of the carriage, and detachable connections between the wrapper and carriage for raising the wrapper from the cable and supporting the wrapper for passing a cable band.

34. In a cable wrapping machine, a wrapper having a rotating frame enclosing the cable, a plurality of reels on said frame enclosing the cable and arranged end to end, friction devices between the frame and each of said reels controlling the rotation of the reels, and guides directing the wrapping to the cable at the end of the wrapper and reversible on the wrapper for wrapping at either end of the wrapper.

CHARLES C. SUNDERLAND.